Feb. 14, 1956          J. YOUHOUSE          2,734,985
HEAT-RESPONSIVE CONTROL
Filed Feb. 21, 1951
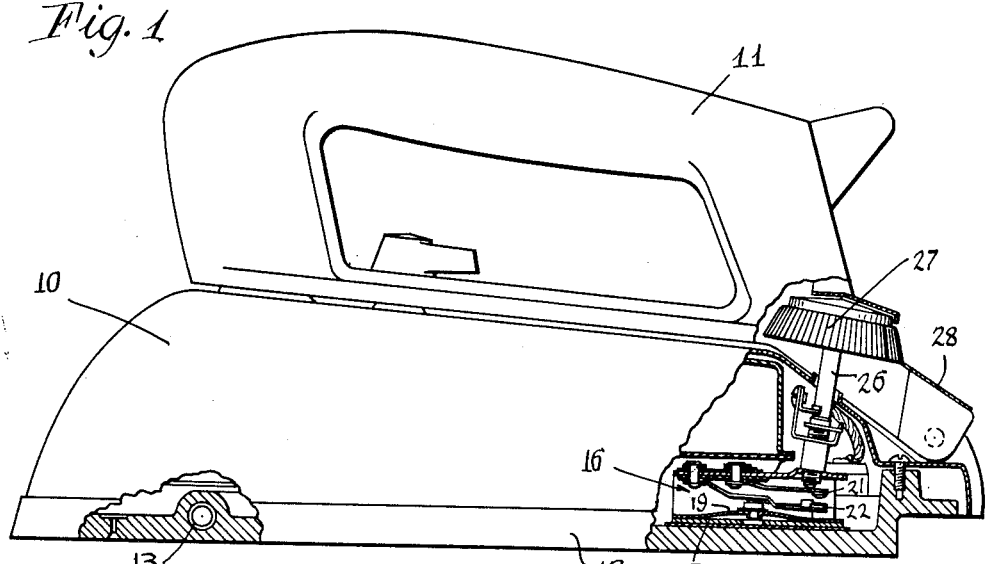
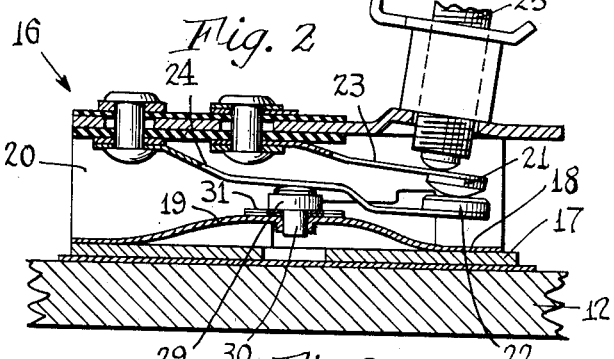
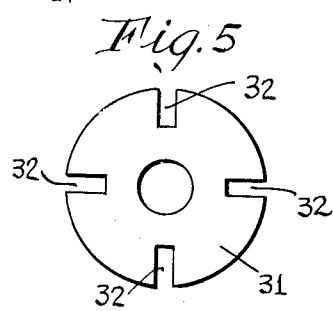
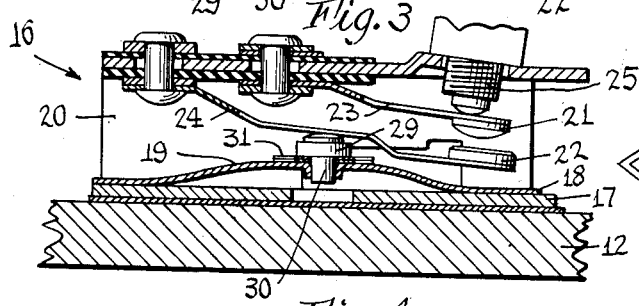
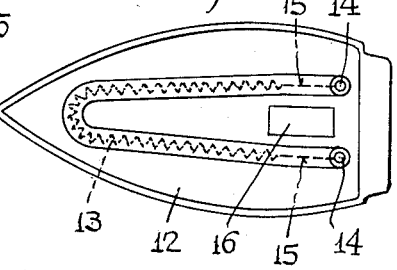
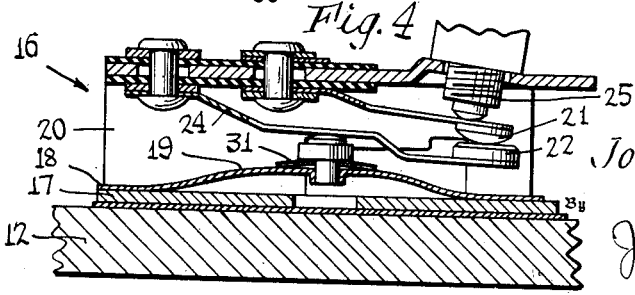
Inventor
Joseph Youhouse
By Johnson and Kline
Attorneys United States Patent Office 2,734,985
Patented Feb. 14, 1956

2,734,985

HEAT-RESPONSIVE CONTROL

Joseph Youhouse, Fairfield, Conn., assignor to Casco Products Corporation, Bridgeport, Conn., a corporation of Connecticut Application February 21, 1951, Serial No. 212,074

10 Claims. (Cl. 219—25)

This invention relates to thermostats, and more particularly to thermostatic controls as used in electric flat irons and like appliances.

Various types of thermostats have been used in flat irons in the past, some involving bimetallic strips which flex due to unequal expansion of the materials making up the strips. Other thermostats involved expansible members of substantial length, extending along the sole plate and acting on levers or linkages to control the circuit. A compact type of thermostat which is now being used because of various advantages consists of a pair of relatively short, coextensive, high and low expansion strips secured together at their ends, the low-expansion strip being bowed or bulged and at its center moving laterally toward or away from the high-expansion strip in response to cooling and heating of the latter. A movable switch part is actuated by the center portion of the low-expansion strip, to control the flat iron circuit or to control other apparatus, as the case may be. While this type of thermostat is powerful and rugged, and has the further advantages of simplicity and compactness, it may, as with the bimetal thermostat, cause overshooting of the sole plate temperature when the iron is initially connected. I attribute this overshooting to the lag experienced by the thermostat in becoming fully heated. As an example, if a flat iron having such a thermostat is set for a temperature of 350°, when the iron is initially connected the temperature will rise considerably above 350° before the thermostat operates to open the circuit. Usually, thereafter the thermostat becomes saturated with heat and functions to control the temperature within the desired range. However, the initial overshoot is undesirable in that it may conceivably result in scorching of a valuable fabric.

In accordance with the present invention this disadvantage of overshooting of the desired temperature is overcome, and accordingly an object of the invention is to provide an improved thermostat which will counteract or compensate for the delay in its becoming fully heated, thereby to prevent overshooting of the temperature of the flat iron or appliance controlled by the thermostat.

Another object of the invention is to provide an improved thermostat as set forth above, which is simple and compact in construction, and is economical to fabricate and to assemble.

Still another object of the invention is to provide an improved thermostat according to the foregoing, which is reliable in its operation at all times. The invention is illustrated as comprising a bulge-type thermostat; however it is not limited thereto, since it may be embodied in bimetallic thermostats or other types.

The above objects are accomplished, in the specific embodiment of the invention illustrated herein by the provision of a bulge-type thermostat having a bowed low-expansion member actuating switch contacts, together with auxiliary or compensating heat-responsive means so arranged as to alter the movement of the switch contacts as effected by the low-expansion member during the initial heating of the thermostat. In the illustrated construction an actuator button is carried by the low-expansion strip, engaging the movable contact to operate the same in response to bowing of the strip. In connection with this button I provide a bimetallic disk or washer which is interposed between the button and the low-expansion strip and arranged to raise or lower the button with respect to the strip in response to temperature changes. This bimetallic washer is in relatively poor heat-conducting relation with the high-expansion strip of the thermostat, and attains its operating temperature later than the high-expansion strip during the initial heating of the iron.

When the bimetallic washer is cold the result is to make the contacts open more quickly during initial heating of the thermostat, and accordingly the lag in the heating of the washer is utilized to quicken the response of the thermostat, in effect. That is, the thermostat contacts will open sooner during initial heating of the flat iron than if the bimetallic washer were omitted.

I have found that this action is desirable and advantageous in that it results in the sole plate temperature of the iron being prevented from overshooting. When the thermostat becomes saturated with heat the bimetallic washer becomes bowed and alters the relation between the thermostat and the contacts actuated thereby so as to maintain the temperature indicated by the setting of the thermostat. Accordingly, by the mere addition of a single simple component, the bimetallic washer, interposed between the low-expansion strip and the actuator carried thereby, I obtain a compensated thermostat which effectively prevents overshooting of the sole plate temperature when the iron is initially heated. The resulting device is thus extremely simple, compact, economical to fabricate and reliable in its operation.

Other features and advantages will hereinafter appear.

In the accompanying drawings:

Figure 1 is a side elevational view of a flat iron embodying the improved thermostat of the invention, portions of the flat iron being broken away and being shown in vertical section to reveal interior details.

Fig. 2 is an enlarged fragmentary view showing portions of the thermostat and sole plate in vertical section, all parts being in cold condition.

Fig. 3 is a view like Fig. 2, but with the parts partially heated but not saturated, the thermostat contacts being open.

Fig. 4 is a view like Figs. 2 and 3 but with the thermostat fully saturated with heat.

Fig. 5 is a plan view of the bimetallic washer constituting the compensating heat-responsive means; and Fig. 6 is a plan view on a reduced scale of the sole plate, heating element and thermostat assemblage.

Referring to the drawings, Fig. 1 shows a flat iron having a body 10 and handle 11, and having a sole plate 12 provided with a heating element 13 which is preferably imbedded in the sole plate. As shown in Fig. 6 the heating element 13 may have a U-shape, with terminals 14 at the rear of the sole plate, said terminals being connected with the heating element through leads 15.

Disposed on the rear portion of the sole plate 12 between the terminals 14 and leads 15 of the heating element is a thermostatic control 16 of the bulge type.

Referring to Fig. 2, the thermostat 16 comprises a high-expansion strip 17 which may be of brass or like material, disposed broadside to a low-expansion strip 18. The strip 18 has a bowed middle portion 19, and is secured at its ends to the strip 17, as by welding.

The high and low expansion strips 17 and 18 are mounted in a casing 20 which is secured to the sole plate 12 by suitable means not shown. Carried within the casing 20 are contacts 21 and 22, mounted on resilient arms 23 and 24. The contact 21 and arm 23 are normally stationary and are adjustably positioned by an adjusting screw 25 constituting part of a shaft 26 carrying a knob 27 which is cooperable with a scale 28 carried by the rear portion of the flat iron body 10.

The arm 24 is engaged by a button 29 having a shank 30 passing through a central opening in the bowed portion 19 of the low-expansion strip 18.

In accordance with the present invention I provide a second heat-responsive means to compensate for failure of the heat from the forward portion of the sole plate to instantly fully heat the thermostat 16. This means comprises a bimetallic disk or washer 31, preferably having a plurality of cuts or slots 32 in its periphery, said washer being interposed between the button 29 and the bowed portion 19 of the low-expansion strip 18. As shown in Figs. 2, 3 and 4 the shank 30 of the button 29 passes through the washer and securely positions it.

The washer 31 is normally flat or substantially flat, and is arranged to flex or become bowed when it is heated. Accordingly, whenever the thermostat is fully saturated with heat so that the washer 31 is bowed, see Fig. 4, it will act to engage the contacts 21 and 22, or to reduce any existing spacing between the contacts and thereby automatically set or adjust the thermostat so as to produce a higher average temperature of the heating element 13 and sole plate 12. However, when the washer 31 is cold, as shown in Figs. 2 and 3, it will tend to separate the contacts 21 and 22 or increase any existing spacing between the contacts, automatically altering the thermostat functioning in a manner to open the circuit sooner during the heating-up period.

Operation of the improved thermostat of this invention is as follows:

Referring to Fig. 2, the thermostat is shown in its cold condition, and the setting of the knob 27 is such as to close the circuit between the contacts 21 and 22 and establish a contact setting to produce a certain temperature as desired by the user. For example, such temperature might be 300°. When the flat iron is connected to an electrical outlet, current will flow through the heating element 13, heating the sole plate 12, and this heat will be transferred to the thermostat 16, first through the high-expansion strip 17. Accordingly this strip, during the initial heating of the thermostat 15 will have a higher temperature than the bimetallic washer 31, and this condition will continue until the thermostat becomes saturated with heat. Accordingly, the washer 31 will remain flat, as shown in Figs. 2 and 3. As the high-expansion strip 17 elongates it will reduce the bowing of the strip 18 and accordingly separate the contacts 21 and 22 as shown in Fig. 3, and this will occur before any appreciable bowing of the bimetallic washer 31 takes place. The separation of the contacts 21 and 22 thus occurs relatively soon after the iron is initially connected to the outlet, and therefore the temperature of the sole plate 12 is prevented from overshooting any substantial amount over the 300° setting of the thermostat. As the thermostat now cycles it will become saturated with heat, bowing the bimetallic washer 31 and automatically altering the setting of the button 29 and contact 22 with respect to the low-expansion strip 18. The net effect of the bimetallic washer 31 becoming heated is thus the same as turning the screw 25 to lower the stationary contact 21. However, the provision of the bimetallic washer accomplishes this change automatically, and thus there is required no additional attention on the part of the user.

It will be observed from an inspection of Fig. 6 that the thermostat 16 is somewhat remote from the heating element 13 being disposed between the leads 15 thereof. Accordingly, the forward and center portion of the sole plate 12 will become heated much more rapidly than the rear portion of the sole plate, and said forward and center portions will then tend to overshoot the temperature for which the thermostat is set. As at present understood, referring to Fig. 6, the reason for the sole plate temperature tending to overshoot the setting of the thermostat when no bimetallic washer is utilized is because a certain amount of time is required for the heat to reach the thermostat and fully heat the same.

If the bimetallic washer 31 were not used, the same effect could be obtained to prevent overshooting of the sole plate temperature by setting the knob 27 for a lower temperature than 300°, as for example 250°, and then gradually increasing the setting of the knob to 300° as the thermostat becomes fully heated. Such operation would prevent overshooting of the temperature of the sole plate 12. However, it would of course be extremely inconvenient to a user and would not be practical. Thus, by the present invention, with the provision of the bimetallic disk 31, overshooting of the temperature of the sole plate 12 is automatically prevented without requiring that the user gradually advance the setting of the knob 27.

The thermostat of this invention is seen to be extremely simple and compact, and also economical to produce in that but a single additional part need be incorporated in an ordinary bulge-type thermostat to effect the automatic compensation explained above, this part being the bimetallic washer 31. Moreover, the ruggedness and reliability of this type of thermostat is not adversely affected by the provision of the washer 31.

The bimetallic washer 31 may be thought of in relatively poor heat-conducting relation to the low and high expansion strips 18 and 17 for the reason that the washer is not integral with the strips, having no continuous or unbroken metallic path to the strips through which heat may travel. Instead, the washer 31 is disposed alongside the low-expansion strip 18, and in the event the washer starts to bow it has a very limited area of contact with the strip 18. Moreover, it is remote from the high-expansion strip 17, which may be considered as the prime actuator of the thermostat 16.

In the appended claims I refer to the high and low expansion strips 17 and 18 as the main heat-responsive means of the thermostat 16, since they constitute the basic instrumentality actuating the contact 22. The bimetallic washer 31 I term a compensating heat-responsive means since it compensates for the delay of the heat in reaching the thermostat 16 from the heating element 13.

Variations and modifications may be made within the scope of the claims and portions of the improvements may be used without others.

I claim:

1. In a thermostat, a main heat-responsive means having spaced high and low expansion elements; a movable part operatively connected to said main heat-responsive means to be moved in one direction along a predeterminate path by and in response to heating of said means; and auxiliary means temporarily positioning said part at an advanced point along said path during initial heating of the main heat-responsive means, said auxiliary means including a compensating heat-responsive means juxtaposed to said low-expansion element and in relatively poor heat-conducting relation with the high-expansion element whereby said two heat-responsive means may have different temperatures during the initial heating of the main heat-responsive means.

2. In a thermostat, a main heat-responsive means; a movable part operatively connected to said main heat-responsive means to be moved in one direction along a predeterminate path in response to heating of said means; and auxiliary means separate from the main heat-responsive means, temporarily positioning said part at an advanced point along said path during initial heating of the heat-responsive means, said auxiliary means including a compensating heat-responsive means devoid of restraint from the main heat-responsive means and connected between the movable part and main heat-responsive means, said compensating means being adjacent to and in relatively poor heat-conducting relation with the main heat-responsive means whereby said two means may have different temperatures during the initial heating of the main heat-responsive means.

3. In a thermostat, a main heat-responsive means comprising separated high-expansion and low-expansion members; a movable part operatively connected to said main heat-responsive means to be moved in one direction along a predeterminate path in response to heating of said means; and auxiliary means separate from the main heat-responsive means, temporarily positioning said part at an advanced point along said path during initial heating of the main heat-responsive means, said auxiliary means including a compensating heat-responsive means adjacent to the low-expansion member and in relatively poor heat-conducting relation with the high-expansion member whereby said compensating means and high-expansion member may have different temperatures during the initial heating of said member.

4. In a thermostat, a main heat-responsive means comprising a thin high-expansion strip and a thin low-expansion strip disposed broadside to each other, said low-expansion strip being bowed; a movable part operatively connected to said main heat-responsive means to be moved in one direction along a predeterminate path by the low-expansion strip when the main heat-responsive means is heated; and auxiliary means separate from the main heat-responsive means, temporarily positioning said part at an advanced point along said path during initial heating of the main heat-responsive means, said auxiliary means including a compensating heat-responsive means interposed between the movable part and low-expansion strip, said compensating means being in relatively poor heat-conducting relation with the high-expansion strip whereby said means and strip may have different temperatures during the initial heating of the strip.

5. In an electric flat iron, a sole plate; a heating element carried by the sole plate; a main heat-responsive means mounted on the rear portion of the sole plate, said heat-responsive means being disposed substantially wholly to the rear of the heating element; an electric control for the heating element, including a movable part operatively connected to said main heat-responsive means to be actuated by the heat-responsive means; and auxiliary heat-responsive means temporarily altering the movement of said part as effected by the main heat-responsive means during initial heating of the latter, said auxiliary means temporarily changing the characteristic of the control and preventing overshooting of the sole plate temperature when the iron is first connected.

6. In an electric flat iron, a sole plate; a heating element carried by the sole plate; a thermostat mounted on the rear portion of the sole plate, having an expansion member disposed closely adjacent the sole plate, said thermostat being disposed substantially wholly to the rear of the heating element; an electric control for the heating element, including a movable part operatively connected to the thermostat to be actuated by the thermostat; and heat-responsive means connected with the thermostat and spaced from the sole plate, temporarily altering the movement of said part as effected by the thermostat during initial heating of the latter, said heat-responsive means temporarily changing the characteristic of the control and preventing overshooting of the sole plate temperature when the iron is first connected.

7. In an electric flat iron, a sole plate; a heating element carried by the sole plate; a thermostat mounted on the rear portion of the sole plate, having an expansion member disposed closely adjacent the sole plate, said thermostat being disposed substantially wholly to the rear of the heating element; an electric control for the heating element, including a movable part operatively connected to the thermostat to be actuated by the thermostat; and a bimetallic heat-responsive member interposed between the thermostat and said movable part and spaced from the sole plate, temporarily altering the movement of said part as effected by the thermostat during initial heating of the latter, said bimetallic member temporarily changing the characteristic of the control and preventing overshooting of the sole plate temperature when the iron is first connected.

8. The combination of a bulge-type thermostat having an exposed high-expansion member arranged to receive heat from an external source; a movable part operatively connected to the thermostat to be moved in one direction along a predeterminate path by said thermostat when the latter is heated; and auxiliary heat-responsive means interposed between said part and thermostat, said auxiliary means being separate and remote from the high-expansion member and in relatively poor heat-conducting relation thereto, and temporarily positioning said part at an advanced point along said path during initial heating of said high expansion member.

9. A thermostat having a heat-expansible part arranged to receive heat from an external source; a movable part operatively connected to the thermostat to be moved in one direction along a predeterminate path by said thermostat and in response to heating of said heat-expansible part; and heat-responsive means separate from said heat-expansible part and operatively connected with said movable part and located remote from the heat-expansible part in relatively poor heat-conducting relation thereto, said heat-responsive means temporarily positioning said movable part at an advanced point along path during initial heating of the said heat-expansible part.

10. The invention as defined in claim 1 in which the movable part comprises a switch actuator carried by the low-expansion element, and in which the auxiliary means comprises a bimetal member carried by the low-expansion element and disposed between the latter and the switch actuator, said bimetal member causing relative movement between the actuator and the element.

References Cited in the file of this patent

UNITED STATES PATENTS

| Number | Name | Date |
|---|---|---|
| 1,422,735 | Brown et al. | July 11, 1922 |
| 1,434,633 | Rohne | Nov. 7, 1922 |
| 1,993,956 | Browning | Mar. 12, 1935 |
| 2,171,895 | Sardeson | Sept. 5, 1939 |
| 2,238,110 | Guild | Apr. 15, 1941 |
| 2,313,072 | Hotchkiss | Mar. 9, 1943 |
| 2,332,518 | Koci | Oct. 26, 1943 |
| 2,343,654 | Finlayson | Mar. 7, 1944 |
| 2,373,248 | Lucia | Apr. 10, 1945 |
| 2,389,686 | Reingruber | Nov. 27, 1945 |
| 2,390,948 | Koci | Dec. 11, 1945 |
| 2,496,746 | Opperman | Feb. 7, 1950 |
| 2,496,917 | Poitras | Feb. 7, 1950 |
| 2,518,503 | Sparklin | Aug. 15, 1950 |
| 2,519,601 | Rady | Aug. 22, 1950 |
| 2,527,779 | Weiland | Oct. 31, 1950 |
| 2,528,254 | Swenson | Oct. 31, 1950 |
| 2,533,274 | Matulaitis | Dec. 12, 1950 |
| 2,537,808 | Bate | Jan. 9, 1951 |